United States Patent
Pignatelli

(10) Patent No.: US 9,507,705 B2
(45) Date of Patent: Nov. 29, 2016

(54) WRITE CACHE SORTING

(71) Applicant: SK hynix memory solutions inc., San Jose, CA (US)

(72) Inventor: David J. Pignatelli, Saratoga, CA (US)

(73) Assignee: SK hynix memory solutions Inc., San Jose, CA (US)

( * ) Notice: Subject to any disclaimer, the term of this patent is extended or adjusted under 35 U.S.C. 154(b) by 575 days.

(21) Appl. No.: 14/031,589

(22) Filed: Sep. 19, 2013

(65) Prior Publication Data

US 2014/0089569 A1    Mar. 27, 2014

Related U.S. Application Data

(60) Provisional application No. 61/704,103, filed on Sep. 21, 2012.

(51) Int. Cl.
| | |
|---|---|
| *G06F 11/10* | (2006.01) |
| *G06F 3/06* | (2006.01) |
| *G06F 12/00* | (2006.01) |
| *G06F 12/02* | (2006.01) |

(52) U.S. Cl.
CPC ......... *G06F 12/0246* (2013.01); *G06F 3/0611* (2013.01); *G06F 3/0656* (2013.01); *G06F 3/0659* (2013.01); *G06F 3/0688* (2013.01); *G06F 11/108* (2013.01); *G06F 2211/1009* (2013.01); *G06F 2212/7203* (2013.01)

(58) Field of Classification Search
CPC ............. G06F 12/0246; G06F 3/0611; G06F 3/0688; G06F 3/0656; G06F 3/0659; G06F 11/08; G06F 2211/1009; G06F 2212/7203
See application file for complete search history.

(56) References Cited

U.S. PATENT DOCUMENTS

| | | | |
|---|---|---|---|
| 5,982,675 A * | 11/1999 | Fujimoto | G06F 12/0802 365/189.05 |
| 7,437,515 B1 | 10/2008 | Naamad et al. | |
| 2007/0283081 A1 | 12/2007 | Lasser | |
| 2009/0100946 A1* | 4/2009 | Balinsky | B41J 29/38 73/866 |
| 2009/0172259 A1 | 7/2009 | Prins et al. | |
| 2012/0117328 A1 | 5/2012 | McKean et al. | |

FOREIGN PATENT DOCUMENTS

EP    2 056 203 A1    5/2009

OTHER PUBLICATIONS

International Search Report and Written Opinion of the International Searching Authority for International Application No. PCT/US2013/060375, dated Dec. 26, 2013, 9 pages.

* cited by examiner

*Primary Examiner* — Aracelis Ruiz
(74) *Attorney, Agent, or Firm* — IP & T Group LLP

(57) ABSTRACT

A method of managing a non-volatile memory system is described where data elements stored in a buffer are characterized by attributes and a write data tag is created for the data elements. A plurality of write data tag queues is maintained so that different data attributes may be applied as sorting criteria when the data elements are formed into pages for storage in the non-volatile memory. The memory system may be organized as a RAID system and a write data tag queue may be associated with a specific RAID group such that the data pages may be written from a buffer to the non-volatile memory in accordance with the results of sorting each write data queue. The data elements stored in the buffer may be received from a user, or be read from the non-volatile memory during the performance of system overhead operations.

20 Claims, 4 Drawing Sheets

WRITE CACHE SORTING

This application claims the benefit of U.S. provisional application Ser. No. 61/704,103, filed on Sep. 21, 2012, which is incorporated herein by reference.

BACKGROUND

NAND Flash memory circuits are being used to form memory system where the advantages of access speed are important. In many applications Flash memory systems are replacing mechanical disk drives with and exhibit a substantial decrease in read latency as well as a higher data throughput. Some memory system architectures employ a RAID (originally Reliable Array of Independent Disks) configuration to provide redundancy. Such Flash RAID memories may also be operated so as to minimize the deleterious performance effects associated with certain characteristics of NAND Flash circuits.

Generally, a NAND Flash circuit is organized as a plurality of blocks (e.g, 1024) of memory that are addressable as having a plurality of pages. A characteristic of this memory type is that the pages of a block must be "erased" before they can be re-written with new or modified data The minimum number of pages that can be erased is equal to an integral block in size. There may be, for example, 256 pages in a block. The number of bytes in a page has increased overtime as the technology has evolved, and has increased, for example, from 2 kB in early memories to 32 kB or 64 kB at the present time. Accessing a page for a read operation takes a period of time, perhaps 50 µs. Once accessed, the data of the opened page may be read in a short period of time, perhaps 3 µs.

The user of a memory system usually does not optimize the structure of data to be stored with respect to the specific architecture of the memory system. Rather, the user has selected page sizes and other data attributes so as to improve the efficiency of the data or signal processing performed in the user computer. Hence, a memory system often receives a heterogeneous mixture of data types and may receive data in a variety of page sizes. Page sizes of 512 bytes (typical of programs written for disk memory systems), 1 kB, 2 kB and 4 kB are often encountered. The page size used may be limited by the data transport protocol or other factors.

Further, the data of a received user page may be divided into chunks and stored in the memory circuits of a RAID group. One example is to take a received 4 kB page and divide it into 1 kB chunks, and to store the chunks and a parity chunk for the stored chunks in, for example, 5 separate memory circuits of a RAID group. Since this operation may result in portions of a plurality of user pages being stored in a Flash memory page, a user read request may be inefficient as only a portion of the Flash memory page, once opened, may contain the data that has been requested by the user.

A similar situation may occur when the process of reclaiming out-of-date pages is performed. This process is termed "garbage collection" and results in the moving of remaining valid data from the pages of a block of Flash memory to another block of memory or memory device prior to erasing the block. Since the user may have been addressing data in 4 kB page sizes, while the data was being stored in 64 kB sizes, only some of the portions of the data stored in the Flash pages may be invalid (e.g., data that has been modified and moved to another page of memory). The valid data needs to be manipulated so as to compress the valid data into a smaller number of pages to be moved so as to result in a completely invalid source block that can be erased. This process creates whole blocks of "erased" or "unprogrammed" memory that may again be used to store data.

The mismatch between user page sizes and Flash memory page sizes may lead to a fragmentation of the data such that access to the individual pages may be inefficient in terms of the amount of data read per Flash page access. The garbage collection (GC) process may also be considered as a user of the memory system as it performs reads and writes of data. In this circumstance the user is an internal user performing system overhead functions, including wear leveling.

SUMMARY

A method of managing the write operations of a memory system is described, including providing a non-volatile memory, a controller and a random access memory. The controller is configured to receive data elements to be stored, where the data elements have specific attributes. The data elements are stored in a buffer memory and a write data tag is created for each data element. The write data tag is inserted in a selected one of a plurality of write data tag queues in accordance with a policy, and each write data queue is sorted based on at least one of the attributes associated with the received date elements. Data is written to the non-volatile memory independently from each queue in accordance with the results of sorting each write data tag queue The write data tags of each queue are periodically resorted.

In an aspect, the non-volatile memory is configured into RAID groups, and each write data tag queue may be associated with a RAID group. The data is queued from the buffer and the data elements are written to the corresponding RAID group in non-volatile memory.

The attributes of received data elements may include at least one of logical block address (LBA), logical unit number (LUN), maximum permitted write latency, or a quality of service (e.g. RAID type, ECC type). A different set of attributes may be used for sorting each of the write data tag queues. In an aspect, the sorting criteria may be selected so as to favor the efficiency in performing read operations with respect to the efficiency in performing write operations.

In another aspect, the data elements may be received from the non-volatile memory for pages of data being relocated by the garbage collection process or other system overhead process and the write data tags associated with the data elements are sorted to form data pages from the data elements in the data buffer, by sorting the write data tags so as to improve at least one of LBA locality, original data time locality, or LUN association.

Each of the write data tag queues may be associated with the non-volatile memory of a RAID group and the buffer for the data elements may perform the step of dividing the received data elements into chunks. The chunks of one or more received data elements may be merged into a page of data to be written to a page of the non-volatile memory in accordance with the results of the step of sorting the write data tag queues. The chunk size may be less than or equal to the size of the non-volatile memory page. The data elements may be received from a user, or may be received as a result of reading a page of data or the pages of data of a RAID group from the non-volatile memory. Reading the data from the non-volatile memory may be performed to return data to the user, or in performing a garbage collection operation or other system overhead function, including reconstructing RAID groups in the event of a partial memory failure. When the data page is read from memory, the data page may be divided again into data elements and the write data tag associated with the data element.

DETAILED DESCRIPTION

Figure 1:
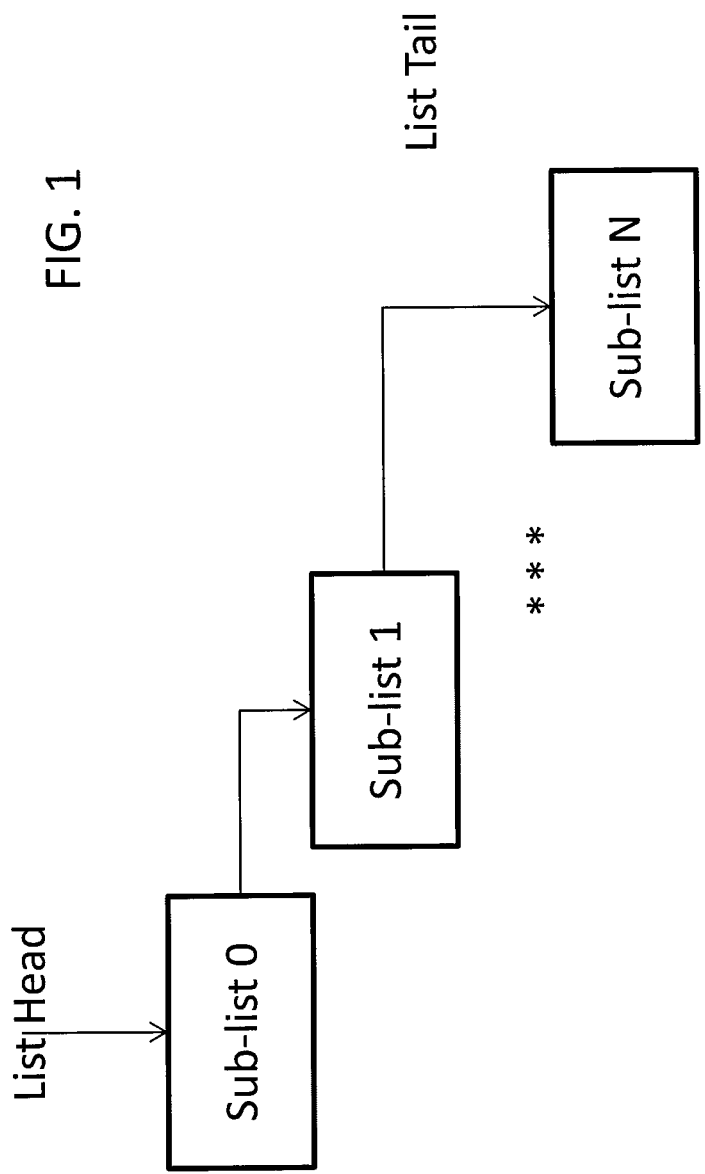
FIG. 1 shows an example of a queue of lists.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The machine-executable instructions can be used to cause a general-purpose computer, a special-purpose processor, such as a DSP or array processor, or the like, that acts on the instructions to perform functions described herein. Alternatively, the operations might be performed by specific hardware components that may have hardwired logic or firmware instructions for performing the operations described, or by any combination of programmed computer components and custom hardware components, which may include analog circuits.

The methods may be provided, at least in part, as a computer program product that may include a non-transient machine-readable medium having stored thereon instructions which may be used to program a computer (or other electronic devices) to perform the methods. For the purposes of this specification, the term "machine-readable medium" shall be taken to include any medium that is capable of storing or encoding a sequence of instructions or data for execution by a computing machine or special-purpose hardware and that may cause the machine or special purpose hardware to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

The normal usage of a write cache may be extended to provide system performance improvements by using the cache or buffer as the source of data for management by multi-channel write queue whereby traffic patterns within each write queue can be re-organized to optimize efficiency (e.g., low latency and high throughput) when the data is subsequently read from FLASH memory. The cache architecture may be split into a data region (buffer) or plane and a control region or plane. The data may be stored in the data plane using any type of cache data structure method: e.g., direct mapped, set associative, or the like. The control plane holds the data sorting attributes and the reference pointers for each of the data entries in the cache. The data plane may be, for example, a region of several GB of storage and may be in a memory, such as DDR SDRAM for speed of access and to avoid wearing the FLASH memory itself. Access to the data stored in the data plane has the characteristics of high bandwidth and low latency that is attainable, for example with standard DDR3 interface technology, or the like. While the control plane may be considerably smaller than the data plane, the data size may exceed the typical amount of on-controller-chip SRAM memory. Since sorting is typically an iterative operation, access latency to an external control plane memory may be a performance limitation for systems operating in the 10 s of MIOPS (Input/Output Operations per Second), a faster random access memory may be used, such as a Hybrid Memory Cube (available from Micron, Boise, Id.). Other fast access memories that exist, such as SRAM, or may be developed in the future to perform similar functions may also be used, depending on the detailed system design, although the use of conventional memory technology is not intended to be excluded.

A hybrid approach can be used, whereby a main queue list of operations is first coarsely divided into blocks of entries in the control plane. Each block is a sub-list to the main queue list. A write data tag data structure containing selected attributes of a data element may be associated data element. Within each of the sub-lists, the write data tags may be sorted using one or more search keys identifying attributes as a metric. The sub-lists may then be arranged in a sorted manner to form the entire queue as shown in FIG. 1. The sub-list organization can be based, for example, on a single attribute of each sub-list, although multiple metrics may also be used. For example, if the sorting metric is address adjacency, then each block is characterized by the median address value across all elements contained by the sub-list. Since the number of sub-lists can be considerably smaller than the total number of list (queue) entries, the parametric median values may be stored on the chip controller. As on chip memory has low latency and high bandwidth, this may facilitate an effective, low-latency search to first identify the destination sub-list for each search key, to be followed by a fast, efficient sort operation over the sub-list size.

The sub-list can be, for example, a block of control data that may be efficiently accessed via a burst mode of DDR SDRAM transactions. An on-controller-chip buffer may hold the burst of control data while the new data is sort-merged with the data, or an old entry is removed from the data buffer. Typically, removal may be sequential, whereas insertion should use an efficient search, such as binary sort (BIN SORT). The method used for sorting is not a limitation: rather, the sizing of the DDR access burst, the DDR access latency, and the number of concurrent (or pipelined) searches should be consistent with the sorting time per sub-list block. This approach may be used to organize data elements for sequential address adjacency or to locate cached elements that have been "in the cache" for too long without having been committed to the non-volatile memory.

Figure 2:
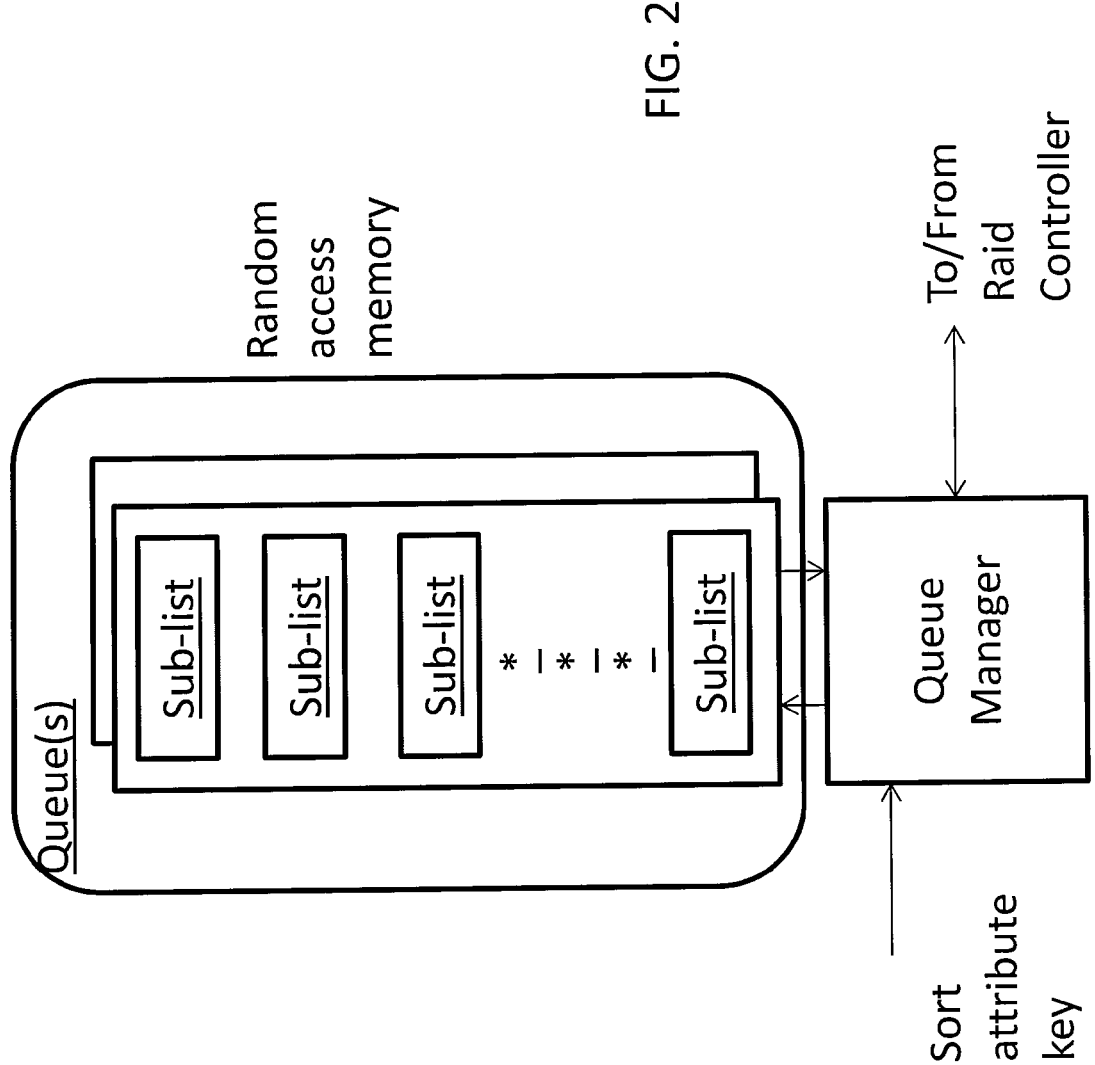
FIG. 2 shows an example of a queue manager that functions to produce a sorted write cache.

Each queue (as shown in FIG. 2) may be represented as a linked list of sub-list blocks controlled by a queue manager, which handles insertion and extraction operations of the queue. The queue manager arranges the list of write data tag elements contained in each sub-list block, by using a binary sorting algorithm, for example. Each queue element can be sorted using various attributes: the logical block storage address (LBA) being the most obvious. But, for example, the cache entry age (write latency), QoS (differentiated storage), or LUN can be used as well. The attributes may be assigned to a write tag entry when the data is inserted in the queue, and each tag may be reassessed as the block is being sorted, or while block is being transferred to or from the SDRAM or other random access memory.

Write operations may be "localized" in accordance with a sorting criteria while resident in the write tag cache to provide a more optimal packing in the Flash memory to support higher data rates and lower access times upon subsequent reads. The localization function acts to form "lists" of transactions for each Raid Group (RG) of a RAIDed memory system. The lists represent write operations meeting specific criteria for the list that may be performed independently of the write operations in another list.

One may use such write tag attributes as LUN, LBA, or clock time, as examples, to preferentially group chunks of data so that the data being stored in a page of the Flash memory has a more than random association with the user read requests. Such associations based on address or temporal locality may result in more of the data of a page of the Flash memory, once opened for a read operation, to be usable to respond to the read request. This improves the overall efficiency of the memory read operations by reducing the average access time to retrieve a desired page of user data.

Each list may be implemented, for example, as a doubly-linked-list of sub-list blocks. Within each list, write transactions may be ordered using a BIN SORT algorithm. Other sorting techniques may be used. This structure may be useful to support a large list (e.g., 128K items or more per list), while using a block-type intermediate data structure to support efficient sort operations and the use of external SDRAM. Other sorting techniques may be used depending on the specific design.

Figure 3:
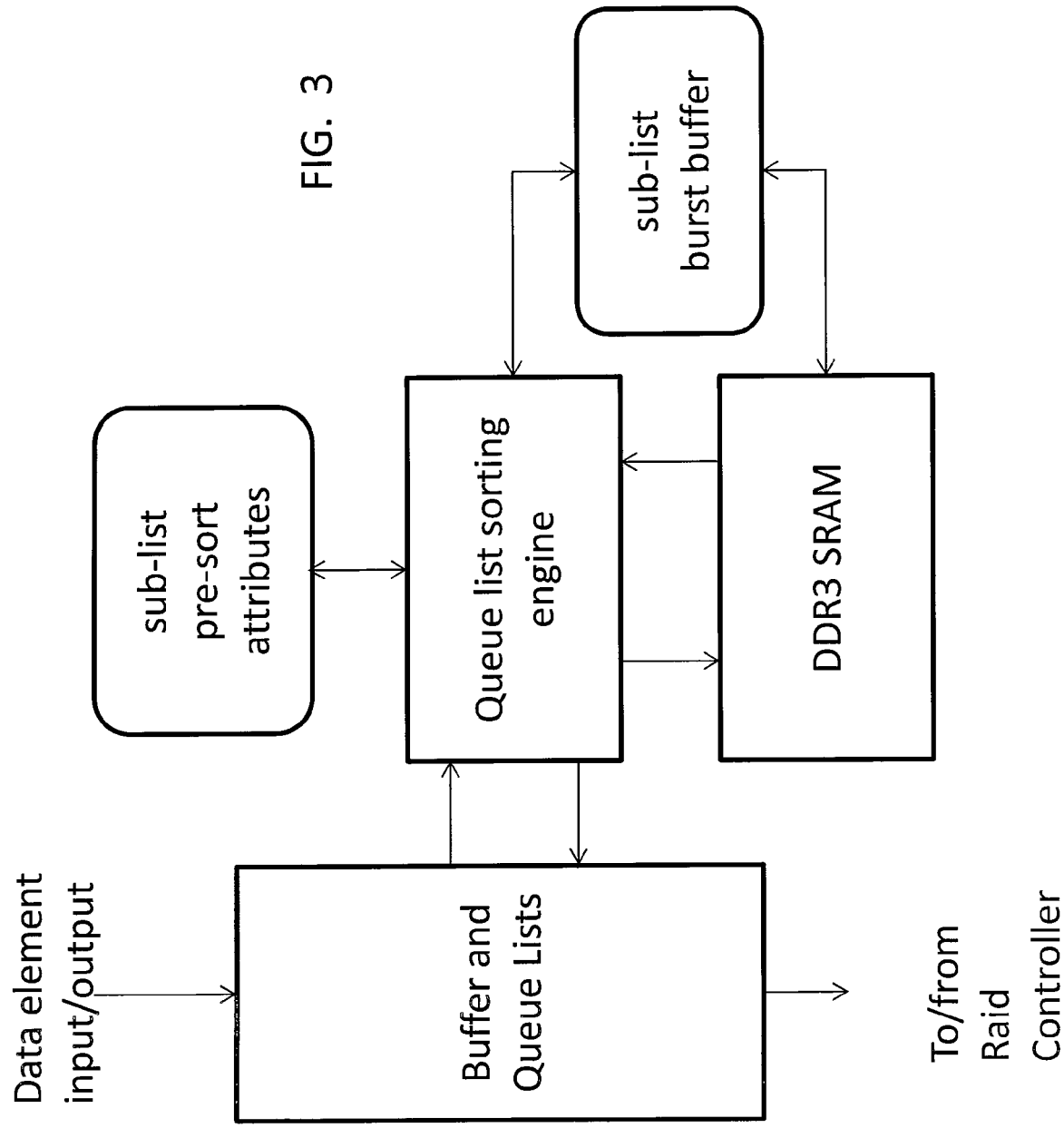
FIG. 3 shows an example implementation of a queue manager with reference to internal features thereof.

In an example, shown in FIG. 3, a hybrid technique may be used where a sub-list block may be chosen from the list based initially on using the block median address (BMA) that would be maintained in the "pre_sort attributes" table. The BMA points to the block containing a median write address value (the field being sorted) in the middle (by value) of the lowest address in the list and the highest address in the list. Thus by loading the BMA, and using linked-list pointers to adjacent blocks, an insertion point in the list can be found. Then, the selected sub-list block may be transmitted in a burst over the DDR3 interface and stored internally in the "sub-list burst buffer". This algorithm is iterative and may be performed on multiple orthogonal queues concurrently, whereby a current sort is performed by the "sort_engine" while two more burst transfers may be sending updated sub-list blocks back to, or retrieving new sub-list blocks from, the external DDR3 SDRAM.

Figure 4:
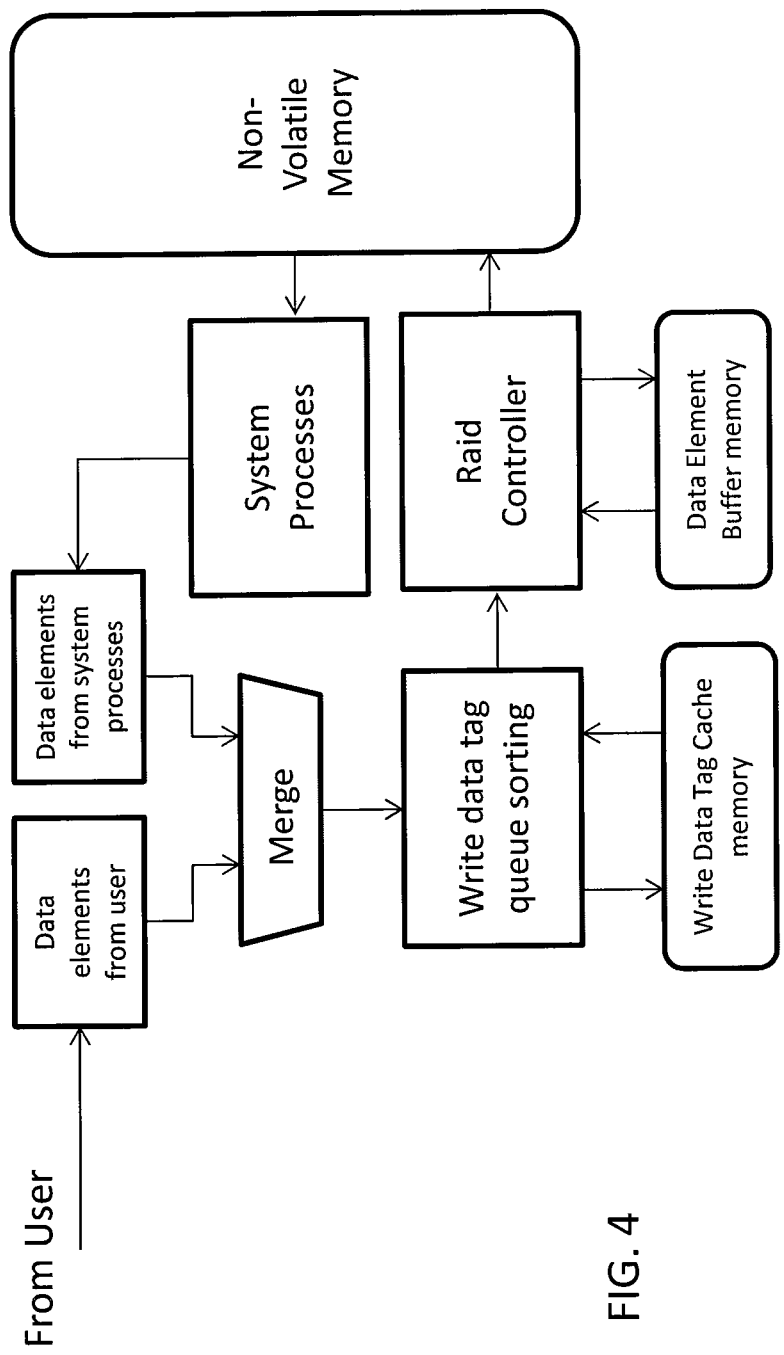
FIG. 4 shows a system using a sorted write cache in conjunction with other non-volatile memory system functions.

In the system diagram shown in FIG. 4, the write cache also acts as a normal data cache providing very-low-read-latency for "just written" non-volatile user data. As well, when the system garbage collection (GC) function operates, new internal-user write commands are executed to compact the fragmented data. These data write operations are coalesced with new user write operations and associated data elements and the optimizations are performed using the selected attributes. This operation pattern, continued over time, may optimize the locations of user data in the non-volatile memory to enhance overall non-volatile memory access performance. In memory access use cases where read operations are more frequent than write operations, the user data may be stored in Flash memory for extended periods of time, being moved periodically by the GC process, wear leveling or refreshing operations, during which further optimization is performed.

The resultant effect may be understood by characterizing read operation latency time as being represented by the sum of the Memory Page open time and the Data Transfer time. Then the average read access latency (Trd) for a random data pattern would be:

Random_Avg $Trd = T\text{page\_open} + T\text{data\_xfer}$.

However a spatially sorted data pattern may exhibit an average read access latency of:

Sorted_Avg $Trd = T\text{page\_open}/N\text{page} + T\text{data\_xfer}$ where Npage is the number of user data elements contained in a single Flash memory page.

In the limit, Npage can be as high as the number of user data chunks distributed within a Flash memory page; however, such an optimization may be limited due to temporal characteristics of the data. For example, with a memory page open time of 50 µs a data transfer time of 1 µs and Npage=16, the average Random and Sorted read latency may be approximately:

Random_Avg_$Trd$=51 µs

Sorted_Avg_$Trd$=4 µs

This greatly enhanced performance comes at a relatively low system burden since the GC process and other overhead operations are continually moving data within the non-volatile memory. Of course, as user data access patterns vary, benefits from write cache sorting will be variable.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention.

What is claimed is:

1. A method of managing the write operations of a memory system, comprising:
   providing a non-volatile memory, a controller and a random access memory, the controller configured to perform the steps of:
   receiving data elements to be stored, the data elements having specific attributes;
   maintaining a buffer of received data elements to be stored;
   creating a write data tag for each received data element;
   maintaining a plurality of write data tag queues;
   inserting the write data tag in a selected one of the write data tag queues;
   sorting each write data tag queue based at least one of the specific attributes associated with the received data element;
   independently writing data associated with each write data tag queue to non-volatile memory.

2. The method of claim 1, wherein the step of writing the data further comprises:
   dequeing the data from the buffer in accordance with results of the step of sorting each write data tag queue.

3. The method of claim 2, wherein the non-volatile memory is configured into RAID groups, and each write data tag queue is associated with a RAID group.

4. The method of claim 1, further comprising:
   configuring the non-volatile memory into RAID groups.
   associating each of the write data tag queues with a RAID group;
   dequeuing data elements from the buffer in accordance with the sorted write data tags and writing the associated data elements to the corresponding RAID group.

5. The method of claim 1, wherein the write data tag queues are periodically resorted.

6. The method of claim 1, wherein the attributes of the received data elements include a maximum latency time prior to writing to non-volatile memory.

7. The method claim 6, wherein the sorting of write data tag queue identifies data elements in the buffer where the maximum latency time would be exceeded prior to a next sorting of the write data tag queue.

8. The method of claim 7, wherein the identified data element is written to non-volatile memory prior to exceeding the maximum latency time.

9. The method of claim 1, wherein attributes selected for sorting of each write data tag queue are particular to the write data tag queue.

10. The method of claim 1, wherein the attributes of the received data element include a logical block address (LBA).

11. The method of claim 1, wherein the attributes are selected from at least one of: user logical unit number, maximum latency time, quality of service, or logical block address (LBA).

12. The method of claim 11, wherein the sorting attributes are chosen such that an efficiency of read operations is improved by decreasing an efficiency of write operations.

13. The method of claim 12, wherein, when the step of receiving the data elements from the non-volatile memory is performed for pages of data being relocated by a garbage collection process, the write data tags associated with the data elements are sorted to form data pages from the data elements in the data buffer, the data pages having at least one or more elements with improved LBA locality, original data time locality, or LUN association.

14. The method of claim 1, wherein the step of maintaining the buffer includes:
   assembling chunks of one or more received data elements into a page of data to be written to a page of the non-volatile memory in accordance with results of the step of sorting the write data tag queues.

15. The method of claim 14, wherein the chunk size is less than or equal to the size of the non-volatile memory page.

16. The method of claim 1, wherein the step of receiving data elements includes at least one of receiving the data element from a user or receiving the data element from the non-volatile memory.

17. The method of claim 16, wherein the step of receiving the data from the non-volatile memory further comprises receiving the data element as a result of a system overhead operation.

18. The method of claim 17, wherein the system overhead operation is at least one of garbage collection, wear leveling or data refreshing.

19. The method of claim 17, wherein the step of receiving the data element from the non-volatile memory includes re-associating chunks of data element with the corresponding write data tag.

20. The method of claim 1, wherein the write data tag queues are maintained in random access memory.

* * * * *